United States Patent [19]

O'Brien et al.

[11] Patent Number: 5,311,210
[45] Date of Patent: May 10, 1994

[54] ERGONOMIC KEYBOARD AND OPERATOR'S CHAIR

[75] Inventors: Cathy M. O'Brien, Houlton, Wis.; J. Craig Paulson, St. Mary's Point, Minn.

[73] Assignee: Workplace Designs, Inc., Stillwater, Minn.

[21] Appl. No.: 961,298

[22] Filed: Oct. 15, 1992

[51] Int. Cl.$^5$ .............................................. G09G 5/04
[52] U.S. Cl. .................................. 345/168; 345/167; 248/918; 248/181; 248/288.3; 341/22
[58] Field of Search ................. 340/706, 711; 341/22; 248/918, 921, 181, 288.1, 288.3, 458; 364/707; 361/390; 297/185, 186, 183, 217; 345/156, 157, 167, 168

[56] References Cited

U.S. PATENT DOCUMENTS

| | | | |
|---|---|---|---|
| 2,473,037 | 6/1949 | Morgan | 297/217 |
| 4,271,404 | 6/1981 | Tanaka | 340/365 R |
| 4,378,553 | 3/1983 | McCall | 340/365 R |
| 4,438,975 | 3/1984 | Williams | 297/412 |
| 4,661,005 | 4/1987 | Lahr | 400/489 |
| 4,774,514 | 9/1988 | Hilderbrandt et al. | 340/971 |
| 4,917,516 | 4/1990 | Retter | 400/489 |
| 5,017,030 | 5/1991 | Crews | 400/485 |
| 5,022,706 | 6/1991 | Bryan | 297/162 |
| 5,056,743 | 10/1991 | Zwar | 248/118 |
| 5,120,938 | 6/1992 | Rollason | 235/145 R |
| 5,122,786 | 6/1992 | Rader | 340/711 |
| 5,137,384 | 8/1992 | Spencer et al. | 400/489 |
| 5,169,210 | 12/1992 | Fricaro | 297/188 |
| 5,178,477 | 1/1973 | Gambaro | 400/489 |
| 5,195,746 | 3/1993 | Boyd et al. | 273/148 |

OTHER PUBLICATIONS

Kinesis Ergonomic Keyboard advertising brochure.
"Apple Keyboard Aimed at Curbing RSI Faces Controversy" Artile Arom-Minneapolis Star & Tribune—Jan. 7, 1993.
"What's New For Apple Uses ? Plenty of Software, Peripheral Products" Atbile from-Inventor's Daily—Jan. 12, 1993.
Comfort Keyboard System/HealthCare Keyboard Co., Inc. "First Ever Adjustable Computer Keyboard Promises Revolution".
Playthings Dec., 1990.

*Primary Examiner*—Richard Hjerpe
*Assistant Examiner*—Lun-Yi Lao
*Attorney, Agent, or Firm*—Haugen and Nikolai

[57] ABSTRACT

A combination ergonomic chair and bifurcated QWERTY apparatus integrally defined in the armrests of the chair. The combination apparatus includes a pair of adjustable arms for selectively orienting the armrests with respect to the operator. A standard QWERTY keyboard is bifurcated such that each half of the keyboard is defined on each of separate respective armrests. Each keyboard unit is attached to the armrests via a ball-in-socket arrangement and includes half of a QWERTY keyboard on one side, and a ten key numerical pad on the opposite side. A unique arrangement reduces stress, fatigue and injury associated with data entry work by facilitating proper postures to reduce upper extremity cumulative trauma. Each keyboard unit has a curve surface for provided palmar support to the hand while accessing the keypad. The chair and keyboard apparatus also includes a pair of rotary encoders integrally defined in the keyboard support structure to simulate a mouse. The backrest of the chair includes an elbow switch which intermittently disables the keyboard units which requires the operator to extend the elbows rearward to access the switch and reset the keyboard thus causing the operator to stretch periodically. The keyboard support structure is adaptable to most any standard ergonomic chair.

20 Claims, 3 Drawing Sheets

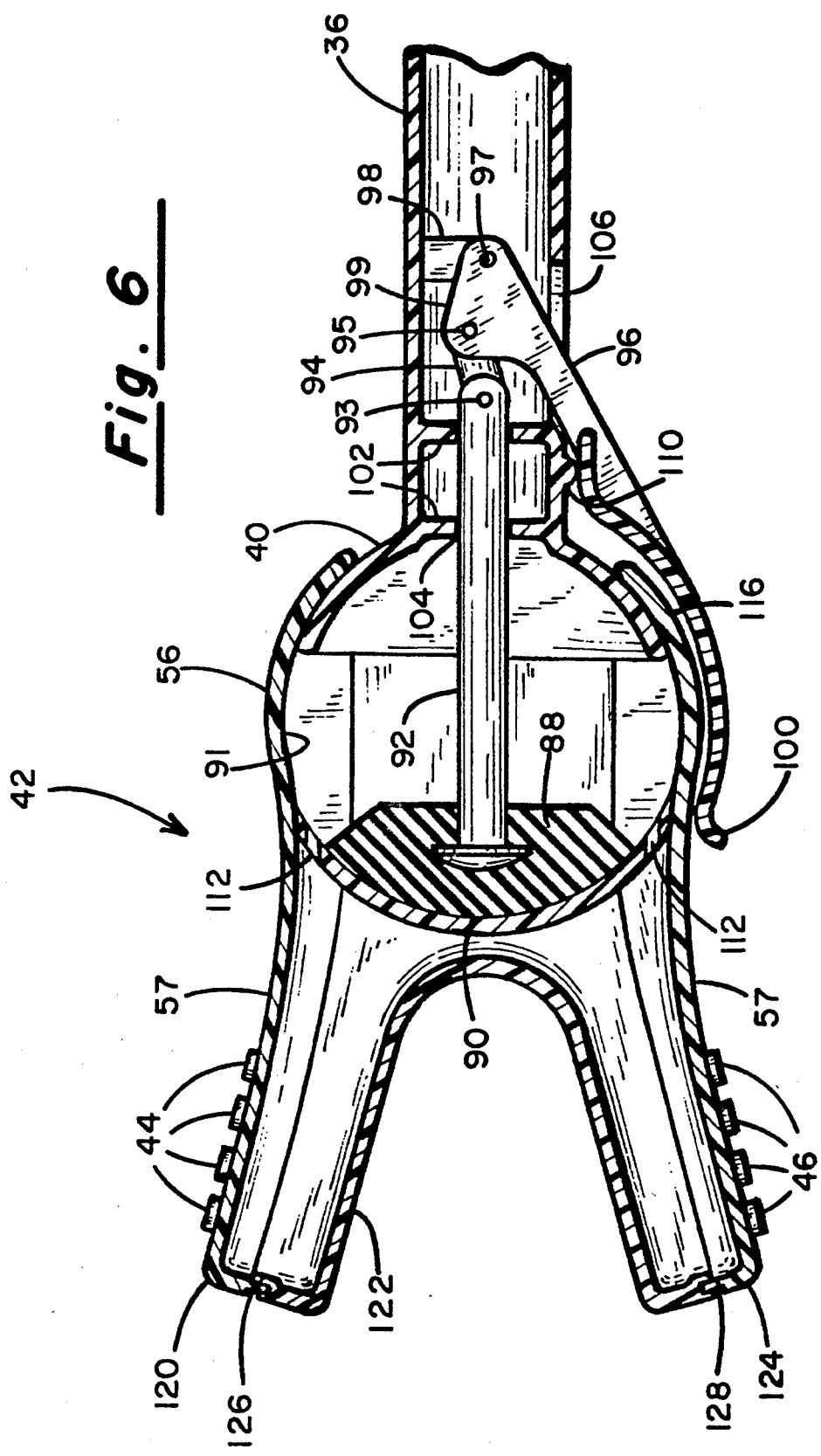

ERGONOMIC KEYBOARD AND OPERATOR'S CHAIR

BACKGROUND OF THE INVENTION

I. Field of the Invention

This invention relates generally to ergonomic chairs and keyboards adapted to be used by desktop computer users, and more particularly, to a combination chair and bifurcated QWERTY keyboard integrally supported by the arms of the chair to reduce upper extremity cumulative trauma of data entry personnel.

II. Discussion of the Prior Art

Office personnel and data entry operators who spend an extensive portion of each work day behind a computer often develop poor posture which can contribute to upper extremity cumulative trauma including carpal tunnel syndrome. While standard chairs are now ergonomically designed to comfortably support the operator before a computer and keyboard, the operator still experiences fatigue in the arms and hands after extended use of the computer. In some computers, the keyboard is integral to the display screen which often exacerbates fatigue of the arms and hands. Other computers are operated by keyboards which are tethered to the processing unit such that the computer keyboard can be placed in the lap of the operator or supported by a table in front of the display. While these keyboards may help to reduce the fatigue of the arms of the operator, this arrangement can still be clumsy and inconvenient.

Several manufacturers offer office furniture which provide convenient arrangements of the computer and keyboard, such as retractable shelves positioned below a desktop for either storing or extending the keyboard towards the operator. These shelves have limited mobility and still require the operator to extend his or her arms in an unsupported position to reach the keyboard, which eventually causes fatigue in the arms and shoulders. Since computers have become essentially a standard tool in a majority of the businesses today, many people experience stress and fatigue associated with operating keyboards for extended periods of time, especially secretarial support staff and data entry workers.

U.S. Pat. No. 5,122,786 to Rader teaches an ergonomic left and right keypad adapted to an armrest of a chair. However, this device fails to provide adequate support for the palm of the hand or a bifurcated QWERTY keyboard.

U.S. Pat. No. 5,022,706 to Bryan teaches a chair with a keyboard support table. This device fails to provide a keyboard assembly integrally defined in the armrests. Hence, the keyboard can slip off the table if angled to accommodate a comfortable position of a user's hand. The table is planar and fails to provide an ergonomically defined keyboard.

U.S. Pat. No. 5,056,743 to Zwar et al teaches an arm support system for a standard keyboard, but fails to teach a bifurcated QWERTY keyboard or provide an arm support integral to a chair and keyboard.

U.S. Pat. No. 4,378,553 to McCall and U.S. Pat. No. 4,661,005 to Lahr teach split keyboards. However, these devices are not separately adaptable to a typist's chair, nor do they provide for palmar support.

An ergonomically designed keyboard apparatus which significantly reduces the stress, fatigue and injury to data entry workers and which reduces the chance of developing poor postures which contribute to upper extremity cumulative trauma would be widely appreciated by today's work force. Both chairs and computers are continually, but separately, being redesigned to reduce the inconvenience of office workers such that each of the devices is ergonomically designed and comfortable to use. However, prior devices fail to provide a combination chair and keyboard arrangement which significantly reduces the stress, fatigue and injury of data entry workers.

III. Objects

It is accordingly a primary object of the present invention to provide a combination chair and keyboard apparatus which is ergonomically designed to significantly reduce the stress, fatigue and injury of data entry personnel.

A further object of the present invention is to provide a combination chair and keyboard apparatus which supports the arms and wrists of the operator, while allowing functional access to a keyboard.

It is another object of the present invention to provide a combination chair and keyboard apparatus which is readily adjustable and adaptable to the particular stature of a given entry operator.

It is still a further object of the present invention to provide a combination chair and keyboard apparatus having multiple keyboards and a control mouse for controlling a computer.

It is yet a further object of the present invention to provide a combination chair, QWERTY keyboard, and ten-key keypad apparatus which is designed based on medical models and engineering/ergonomic models.

SUMMARY OF THE INVENTION

The foregoing objects and advantages of the present invention are achieved by providing a combination chair and bifurcated QWERTY keyboard apparatus, wherein each of the sections of the keyboard is adjustably secured to a respective chair armrest such that they are accessible by the fingers of the operator while his or her arms are supported by the chair's armrests. The combination chair and bifurcated keyboard assembly comprises a chair having a seat, a backrest attached to the seat, and a pedestal attached to and supporting the seat. An adjustable support mechanism is coupled to the chair and extends upwardly along each side of the seat for supporting the armrests to which a split QWERTY keyboard is attached. Each keyboard unit is integrally defined at a distal end of each armrest such that the armrest of the support structure supports the forearms of the operator when the fingers conveniently access the keys without creating pressure at the wrist or elbows.

Each half of the keyboard preferably has a convex shaped portion for providing palmar support to the hands of the operator and a concave, fan-shaped portion to which the keys are mounted. Each such keyboard unit is attached to the distal end of the chair arms by a ball-in-socket arrangement providing up to 30 degrees adjustment in any direction. The support mechanism for the armrests comprises a pair of arcuate links each pivotally joined at opposed ends to the armrests and to a mounting link which is fixedly attached to a chair mounting bracket. Each armrest has a height adjustment mechanism for adjusting the height of the armrest with respect to the chair seat to adapt to and comfortably support the arm of the operator. Preferably, each arcuate link is bowed outwardly from the seat of the chair such that the combination apparatus is adaptable to a majority of the population. The armrests preferably have an upper surface contoured to comfortably receive an arm of the operator.

The support mechanism of the combination apparatus preferably comprises a pair of mounted brackets each fixedly attached to the bottom of the seat of the chair. A mounting link is pivotably attached to each mounting bracket, wherein a pair of arcuate links are each pivotably attached to the respective mounting link in a spaced relation at one end thereof. An armrest is pivotably attached to each of the other ends of the arcuate links such that the armrest is selectively positionable with respect to the seat member via a convenient linkage. The four bar linkage simulates the arm's natural reach motion.

The combination chair and keyboard apparatus further includes a pair of rotary encoders operatively attached to the support mechanism to emulate a computer mouse. By selectively positioning the support mechanism in a forward direction or lateral direction with respect to the seat of the chair, the pair of rotary encoders together provide output signals which are the equivalent of a mouse for moving a cursor about a screen of the computer.

As mentioned, each of the keyboard units preferably include a first and second keypad, wherein the first keypad comprises half of a QWERTY keypad on one side surface, and a ten digit numerical keyboard on an opposing side surface. Each keyboard unit is rotatably attached to a distal end of each armrest such that either the QWERTY or the ten-key keypads can be conveniently and selectively accessed by simply rotating the keyboard assembly relative to the armrest. Both keypads are positioned in the housing of the keyboard unit, the latter having a convex shape such that the housing provides palmar support for the operator.

The invention further includes a control mechanism coupled to the chair proximate the backrest and which periodically disables operation of the keyboard unit. The operator must extend his or her elbows rearward to engage the control mechanism to reset the keyboard. This necessitates that the operator periodically stretch out, tending to eliminate muscle cramping and fatigue.

Each of the first and second keyboard units also comprise a rotatable track ball proximate the thumb location of the operator's hand to provide an ergonomically designed keyboard and mouse arrangement. The left keyboard unit includes the keys found on the left hand of a standard QWERTY keyboard, as well as function and edit keys. The right keyboard unit contains the keys found on the right portion of a standard QWERTY keyboard such that the keyboard units in combination form a standard QWERTY keyboard.

DESCRIPTION OF THE DRAWINGS

FIG. 6 illustrates a sectional side view of one keyboard assembly including an adjusting mechanism for selectively securing the keyboard assembly with respect to the arm.

The foregoing features, objects, and advantages of the invention will become apparent to those skilled in the art from the following detailed description of the preferred embodiment, especially when considered in conjunction with the accompanying drawings in which like numerals in the several views refer to corresponding parts.

DESCRIPTION OF THE PREFERRED EMBODIMENT

Figure 1:
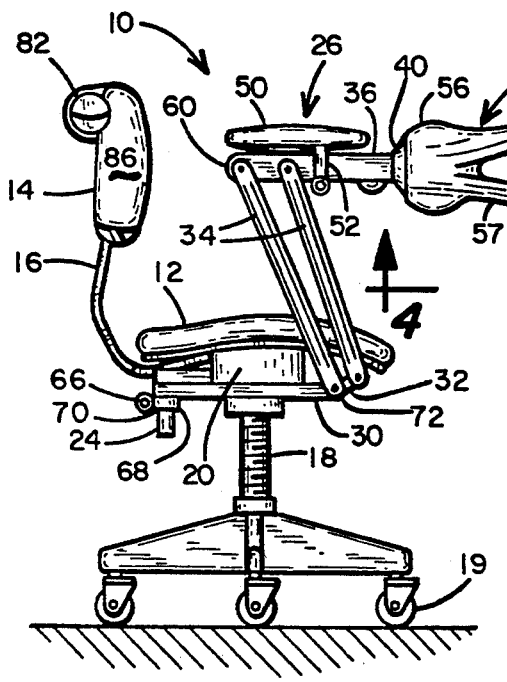
FIG. 1 is a side view of the combination chair and keyboard apparatus illustrating the support structure for the keyboards and how the keyboard units having a pair of keypads are rotatably attached to the support structure in a ball-in-socket arrangement.

Referring to FIG. 1, a side elevation of a combination chair and keyboard apparatus according to the preferred embodiment of the invention is generally shown at 10. A first portion of apparatus 10 comprises a chair having a padded seat member 12, a padded back support member 14 vertically supported by a rigid support member 16, and a pedestal structure 18 including a plurality of wheels 19 supporting seat portion 12. The chair portion thus far described is well known in the art. It is ergonomically designed such that seat portion 12 and back support portion 14 are contoured to conform to the anatomy of a user. Seat member 12 is rotatably coupled to support structure 18 via a rigid brace member 20 which is fixedly attached to a bottom surface of seat 12. A pair of L-shaped mounting brackets 24 each having a circular cross section are each fixably attached along the longer leg thereof to the bottom surface of seat 12 via a bolt arrangement (not shown), wherein the shorter leg extends downwardly from seat member 12. Each mounting bracket 24 facilitates attachment of the support structure to the chair as will now be described.

A support structure comprising a pair of movable arms is operatively attached to each of the respective mounting brackets 24 and is generally shown as assembly 26. Each arm assembly 26 comprises a rigid elongated mounting link 30 rotatably and selectively securably attached to the downwardly extending shorter leg of a respective mounting bracket 24 at one end, and extends generally parallel to seat member 12 as shown. A short rigid support member 32 is fixedly attached to and extends at an acute angle from one end of mounting link 30 at an end of mounting link 30 opposite the end pivotably attached to mounting bracket 24. Support member 32 is substantially shorter than mounting link 30 and facilitates orientation of the respective keyboard unit in the vertical direction as will be discussed shortly. A pair of rigid elongated arcuate links 34 are each, but separately, pivotally attached at one end to opposite ends of shorter member 32. Each arcuate link 34 extends upwardly and is pivotally attached to a rigid horizontal armrest 36 at spaced locations at one end of armrest 36. Armrest 36 in combination with arcuate links 34 and member 32 essentially forms a parallelogram. Armrest 36 can be laterally positioned by rotating respective armrest assembly 26 about mounting bracket 24, but also can be adjusted in the vertical direction due to the parallelogram-design linkage arrangement to provide a comfortable orientation for the operator's arm. Each member is pivotally attached to one another but with inherently sufficient friction such that resting an arm on armrest 36 does not readjust the orientation of the support structure 26. One needs to provide an additional force to overcome the friction to readjust the orientation of the members.

A ball shaped member 40 is fixedly attached to a distal end of each armrest 36 opposite the end where armrest 36 is pivotally attached to arcuate links 34. A pair of keyboard units 42 each having a plastic molded housing are integrally formed about respective ball member 40 in a ball-in-socket arrangement. Each keyboard unit 42 is adjustable in any three dimensions up to approximately 30 degrees, however, limitation to this degree of angulation is not to be inferred. Each keyboard unit 42 comprises a pair of keypads including a first keypad 44 including keys of one half of a standard QWERTY keyboard, and a second keypad 46 comprising a standard ten-key numerical keypad such that a preferred hand can operate keypad 46. Each keyboard unit 42 can be selectively rotated about ball member 40 due to the ball-in-socket arrangement such that either keypad 44 or keypad 46 is facing upwardly and is accessible by the fingers of an operator when the forearm of an operator is supported by armrest 36. An elongated padded forearm support 50 is adjustably and securably attached to each armrest 36 via a clamp 52 as shown such that forearm support 50 can be rotated about armrest 36, or can slide longitudinally along armrest 36. Each forearm support member 50 has an upper surface contoured in a concave shape conforming to the curvature of the forearm of an operator. Forearm support 50 supports the forearm of an operator as the hand of an operator is disposed over and accesses the keypad facing upwardly from respective keyboard unit 42.

As shown in FIG. 1, keyboard unit 42 has a generally curved and ball-shaped housing such that a curved portion 56 provides palmar support to the hand of the operator as the fingers of the operator access the respective keyboard keypad 44 or 46, whichever is facing upwardly. The keys of both keypads 44 and 46 are mounted in a respective fan-shaped portion 57 extending from the ball-shaped housing. The keys reside in a concave portion defined between curved portion 56 and a distal end of fan-shaped portion 57 to comfortably receive the user's finger tips. Thus, arm 26 with the combination of forearm support 50 and palmar support portion 56 support the arm and hand of the operator as the operator functionally accesses the respective keypad. A cross section of keyboard housing 56 is circular and symmetrical in shape such that regardless of the orientation of keyboard unit 42 axially about ball 40, portion 56 still is curved outwardly to support the palm of the hand.

As previously discussed, the four bar linkage arrangement of member 32, arcuate links 34 and armrest 36 provides a parallelogram such that each keyboard unit 42 can be positioned vertically. Thus, the blood flow in the arm and hand of the operator can be varied by occasionally changing the relationship of armrest 36 with respect to the user's body. For instance, armrest 36 can be elevated to reduce blood flow to the hand, and can be lowered to increase blood flow to the hand, whichever is most comfortable to the operator. The four bar parallelogram feature allows the armrest 36 to be positioned in a motion which simulates the arm's natural reach motion.

Figure 2:
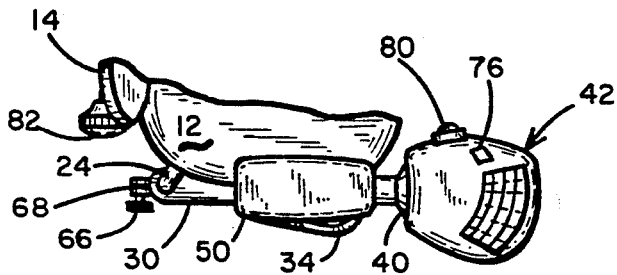
FIG. 2 is a top view of a portion of one armrest of the support structure illustrating the forearm support and the arrangement of the keypads and a mouse of the keyboard unit.

Referring to FIG. 2, a top view of the right keyboard unit 42 and arm support 50 is shown. As previously discussed, a similar keyboard unit 42 is defined on an identical left support arm of the chair and is adapted to be used by the left hand of the operator. The right keyboard unit 42 has 33 keys including all the keys found on the right portion of a standard QWERTY keyboard, and the left keyboard unit 42 has 36 keys including all the keys found on the left portion of a standard QWERTY keyboard, as well as function and edit keys. (See FIGS. 5A-5B). Thus, the left and right keyboard units 42 together define a complete standard QWERTY keyboard.

Each mounting link 30 has a collar pivotally attached to respective mounting bracket 24 as shown. Each mounting link 30 is rotatable about mounting bracket 24 in the lateral direction such that armrest member 36 can be positioned slightly inward towards the operator, or slightly outward from the operator. A standard set screw 66 is provided in combination with a clamp 68 integral to each mounting link 30 for securing each mounting link 30 with respect to mounting bracket 24. Referring back to FIG. 1, set screw 66 is loosened to reduce friction between clamp 68 and mounting bracket 24 such that armrest 36 can be laterally rotated about a vertical portion of mounting bracket 24 and can be slid vertically along the vertical portion of mounting bracket 24 for setting a height adjustment as shown. Set screw 66 can be selectively tightened to provide a desired amount of friction between clamp 68 and the vertical portion of mounting bracket 24. Thus, armrest 36 can be laterally oriented without loosening screw 66 when desired.

Also shown in FIG. 1 is a pair of rotary encoders 70 and 72, which in themselves are well-known in the art, providing an electrical output indicative of the position of the respective support linkage supporting each keyboard unit 42. The first rotary encoder 70 of each arm is integrally defined in clamping collar 68 and provides an output indicative of the angular position of clamp 68 about the vertical portion of respective mounting bracket 24. For instance, if mounting link 30 is angled outwardly from seat member 12, rotary encoder 70 provides an output proportional to the angular orientation of mounting link 30 with respect to mounting bracket 24. Similarly, each respective second rotary encoder 72 is integrally positioned between the arcuate link 34 closest seat back 14 member 32 such that as arcuate link 34 is pivoted forward or rearward with respect to mounting link 30, encoder 72 provides an electrical output directly proportional to and indicative of this angular orientation. In combination, rotary encoders 70 and 72 and members 30, 32, 34 and 36, in effect, provide the equivalent of a mouse, and are electrically connected to the computer (not shown).

By pivoting arcuate links 34 forwardly or rearwardly, respective rotary encoder 72 provides a signal corresponding to an up-down movement of a cursor on a display screen. Similarly, respective encoder 70 provides an output corresponding to a left-right motion of a cursor on a display screen. Hence, the operator can move a cursor on a screen vertically or horizontally by correspondingly moving arcuate links 34 forward and backward via armrest 36, or pivoting mounting link 30 via armrest 36 in a left-right direction about mounting bracket 24. It is anticipated a separate encoder could be provided to control a cursor in a third or Z-direction, in combination with encoders 70 and 72 to provide a three dimensional mouse control. For instance, one of encoders 72 could control the screen cursor in the Y-direction, and the other could control the cursor in the Z-direction. Hence, limitation to a chair with a 3-dimensional mouse control is contemplated with the present invention. Thus, a convenient mouse is integrated into each support structure assembly 26 which supports respective keyboard unit 42 wherein keypads 44 or 46 can be simultaneously accessed.

Referring to FIG. 2, a thumb key 76 is shown forming a portion of respective keypad 44 and serves as a return key. Return key 76 can be used, for instance, to provide a carriage return function after the cursor has been selectively positioned on the screen via the arrangement just described.

Figure 4:
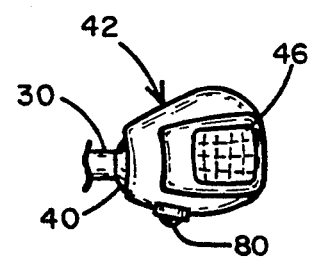
FIG. 4 illustrates a view 4—4 shown in FIG. 1 of a numerical keypad defined in the surface of each of the keyboard units which is opposite the surface having the keypads forming a portion of a QWERTY keyboard.

Also shown in FIG. 2 is a track-ball 80 formed by a conventional ball-in-socket arrangement. Track-ball 80 is integrally defined in each keyboard unit 42 and faces inwardly towards the operator when the QWERTY keyboard 42 faces up such that the respective thumb of the operator can functionally access track-ball 80. Referring to FIG. 4, when keyboard unit 42 is inverted to access the ten digit numerical keypad 46, track-ball 80 is disposed outward and away from the operator and can be accessed by the little finger or the palm of the operator's hand.

Referring back to FIG. 1, an elbow switch 82 is mounted on each side of an upper portion of backrest 14 as shown. Elbow switches 82 are electrically coupled to the computer (not shown). Each switch 82 periodically causes the computer to disable respective keyboard member 42 such that the user must stretch his or her elbows backward to simultaneously engage each switch 82 to perform a reset operation. This forces the operator to periodically stretch or exercise to reduce stiffness in the arms and shoulders during operation. Any of a variety of switches, which in themselves are well known in the art, may be used. However, a ball-type switch as shown is preferred. This switch has a programmable delay setting and requires activation by the elbows of the operator to trigger the switch, which in turn resets each respective keyboard 42 such that the operator can continue to use the keyboards.

Each switch 82 is attached to an elastic sleeve 86 which can be slid over the backrest 14 in a convenient fashion. The wiring from switches 82, encoders 70 and 72, and each keyboard unit 42 can be joined to one common connector (not shown) which can be detachably coupled to a computer using a standard connector typically used to couple keyboards to the computer housing.

Figure 3:
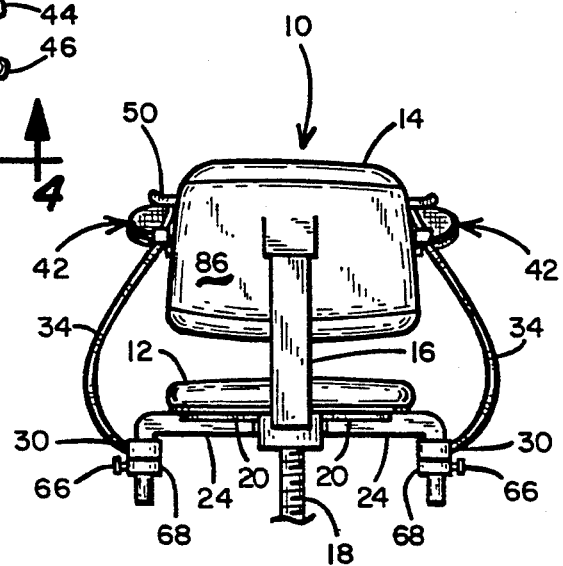
FIG. 3 is a partial rear view of the combination chair and keyboard apparatus illustrating each of the arcuate links of the support structure bowed outwardly, and how each armrest is adjustable in the vertical direction.

Referring to FIG. 3, a back view of the combination chair and keyboard apparatus 10 is shown illustrating how each of outwardly-bowed vertical arcuate links 34 extend outwardly from an operator seated on seat member 12. This ergonomic design provides clearance from the thighs of the operator in a convenient arrangement. Also illustrated is each keypad 42 linked to each of respective vertical arcuate links 34 and providing, as a whole, a complete QWERTY keyboard. Thus, this arrangement facilitates the left hand controlling the left keys of a standard QWERTY keyboard, and the right hand controlling the right keys of a standard QWERTY keyboard. Also shown in FIG. 3 is each set screw 66 and clamping collar 68 securing each respective mounting link 30 about each respective mounting bracket 24 as previously discussed. Again, each mounting link 30 can be pivotally adjusted laterally or longitudinally positioned along the vertical leg of L-shaped mounting bracket 24 and selectively secured by set screws 66 and clamp 68 as desired.

Figure 5A:
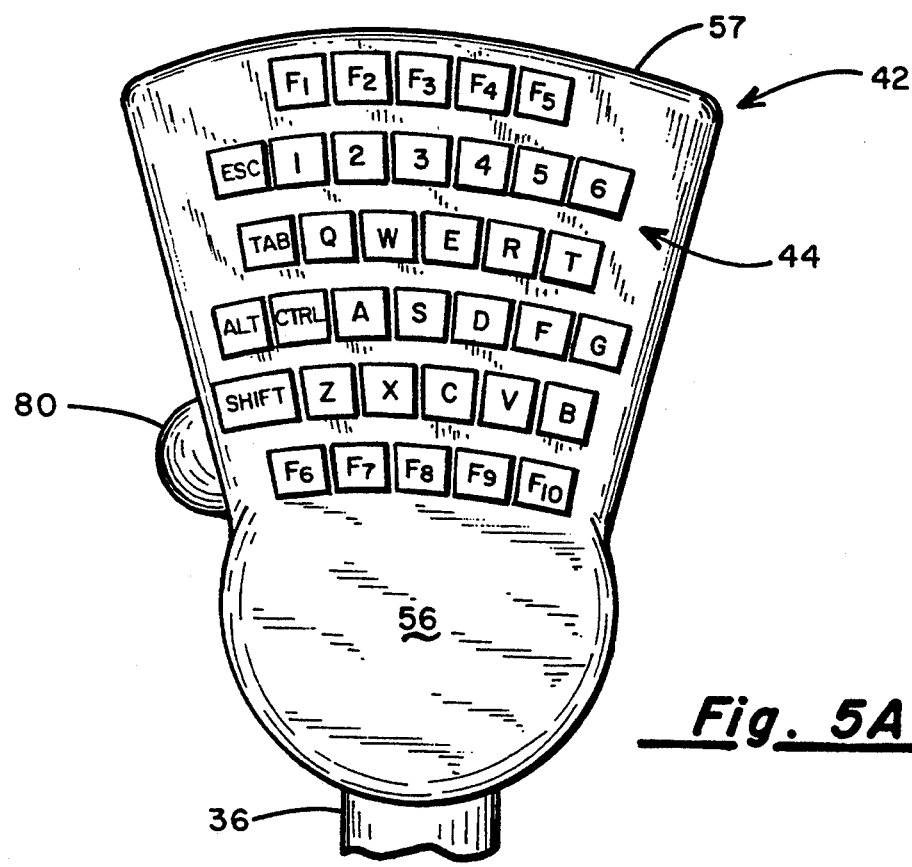
FIGS. 5A and 5B illustrate the QWERTY keypads of each keyboard unit, wherein the left keypad in FIG. 5A also includes function and edit keys.
Figure 5B:
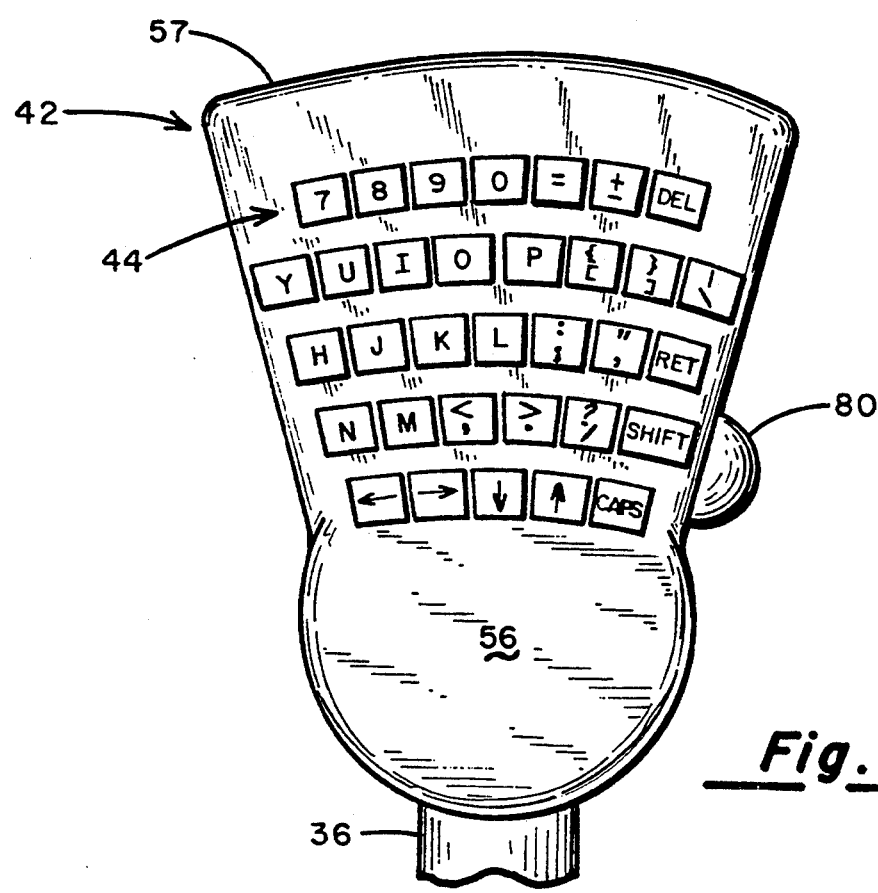

Referring to FIGS. 5A and 5B, a top-view of each keyboard unit 42 illustrating keypads 44 is shown. FIG. 5A illustrates the left keyboard unit having 36 keys including the QWERTY keys normally found on the left half of a standard QWERTY keyboard, and also including function and edit keys. FIG. 5B illustrates the right keyboard unit 42 having 33 keys including the keys normally found on the right half of a standard QWERTY keyboard. Together, they form a complete standard QWERTY keyboard.

Referring to FIG. 6, a sectional side view of one keyboard unit 42 is shown illustrating the adjusting mechanism for selectively securing keyboard unit 42 including keypads 44 and 46 with respect to armrest 36. The locking mechanism comprises a rubber boot 88 having an arcuate outer surface 90 conforming to and selectively engaged with an inner spherical surface 91 of the housing of keyboard unit 42. Rubber boot 88 engages the housing inner wall 91 along an arcuate path extending between the two fan-shaped portions 57 which are oriented opposite armrest 36 as shown. By selectively urging rubber boot 88 to engage the conforming inner wall 91 of the housing of keyboard member 42, rotation of keyboard unit 42 about and with respect to ball-shaped member 40 is restricted due to friction. Selectively releasing rubber boot member 88 from engaging the inner wall 91 allows the operator to rotate keyboard unit 42 about ball-shaped member 40 to a desirable orientation, and to facilitate access to one of keyboards 44 or 46.

The adjusting mechanism further comprises an elongated rigid steel rod 92 extending from a T-shaped end disposed within and secured to rubber boot 88 to a opposite end which is pivotably attached at 93 to a short rigid linkage 94. Linkage 94 is pivotably connected at 95 to a proximal end 99 of an adjusting lever 96. The proximal end 99 of lever 96 is also pivotably secured via a rigid bracket 98 to the inner wall of armrest 36 as shown. Lever 96 has a distal end conforming to the surface of the housing of keyboard unit 42 and includes a curved distal end 100 which is curved outward from the housing of keyboard unit 42 to form a lip. End 100 can be accessed by the fingers of the operator when positional adjustment of keyboard unit 42 is desired. By urging adjusting lever 96 at end 100 outward from the housing of keyboard unit 42 such that lever 96 pivots at bracket 98, linkage 94 in turn causes rod 92 to retract toward the right thus separating rubber boot 88 from the inner surface 91 of keyboard unit 42. Subsequently, keyboard unit 42 can be easily rotated about ball-shaped member 40 in two dimensions. Either of keyboards 44 or 46 can be positioned to face upwardly such that they are accessible by the fingers of the operator, and wherein the respective fan member 57 is angled at a desirable position.

Each armrest 36 includes a pair of disc-shaped reinforcing brackets 102 for structurally reinforcing the distal end of armrest 36 proximate ball-shaped member 40 as shown. Each disc 102 includes a concentric opening 104 for receiving and guiding rod 92 when reciprocated in the lateral direction. Each armrest 36 also includes a slit-shaped opening 106 for receiving the proximal end 99 of lever 96 which is extended therethrough. Opening 106 has sufficient length to prevent interference when lever 96 is rotated as previously discussed.

Each armrest 36 also includes a dome-shaped rubber stopper 110 which is secured to an outer surface of armrest 36 proximate ball-shaped member 40. Stopper 110 ensures that the lever 96 is positioned proximate but spaced away from the housing of keyboard unit 42 when lever 96 is rotated back towards the housing of keyboard unit 42 to secure rubber boot 90 against the inner surface 91. Thus, the fingers of the operator can be inserted under distal end 100 for subsequent adjustments.

Still referring to FIG. 6, a pair of openings 112 are defined through the inner wall 91 of the housing of keyboard unit 42 to facilitate wiring from respective keypads 44 or 46 into the inner chamber defined within keyboard unit 42. This wiring is subsequently routed through apertures (not shown) defined through each of disc brace members 102 and through armrest 36 to connectors as previously discussed. A distal end 116 of the housing of keyboard unit 42 overlaps a preselected arcuate portion of ball-shaped member 40 such that keyboard unit 42 can be adjusted in two dimensions about ball-shaped member 40. Distal end 116 can be slid along the outer conforming surface of ball-shaped member 40 in a low-friction arrangement to provide about 30° rotational freedom of keyboard unit 42 about ball-shaped member 40. However, limitation to 30° of freedom is not to be inferred. For instance, the length of distal end 116 can be predetermined with a shorter or longer length to increase or decrease, respectively, the degree of freedom available when rubber boot 88 is not secured against the inner surface 91 of the housing.

The housing of keyboard unit 42 is comprised of interlocking pieces 120, 122 and 124. Pieces 120 and 122 are selectively connected to each other along an overlapping locking joint 126. Similarly, pieces 122 and 124 are joined together along a locking arrangement 128. Piece 120 is selectively removable from piece 122 to permit access to the underside of keyboard unit 44, and piece 124 is selectively removable from piece 122 to permit access to the underside of keyboard 46. When integrated together, pieces 120, 122 and 124 together form the rigid housing of keyboard unit 42. Joints 126 and 128 are joined together in a friction and "snap" fit such that no other parts are required for fastening pieces 120, 122 and 124 together.

It is particularly noted that the support assembly 26 including each keyboard unit 42 can be adapted to most standard ergonomically designed chairs. Each mounting bracket 24 can be easily attached to the bottom side of seat member 12 using standard fasteners such as screws or bolts. Subsequently, the remaining elements of the support assemblies for both left and right arms can be adapted to the vertical portion of each mounting bracket 24 as shown. Thus, the invention, as shown, comprises a support structure including a bifurcated standard QWERTY keyboard adaptable to most any of a selected number of ergonomically designed office chairs. The sleeve 86 can be adapted about the backrest 14 of most any standard office chair as well. Preferably, the wiring from each elbow switch 82, rotary encoders 70 and 72, and keyboard units 42 is tie wrapped along the respective support members to avoid interference or damage during normal use. The wiring can all be terminated into a single terminal connector (not shown) such that a single electrical cable assembly can couple the wiring form the chair assembly 10 to the computer in a single tether.

A special feature of the present invention is that each support arm assembly 26, including each keyboard unit 42, is independently multipositional with respect to the chair. Further, each support arm assembly 26 is adjustably secured to the chair such that the user can remove his or her arm without loosing the last orientation of the support structure. Each of the support arm assemblies 26 can be vertically oriented via the set screw 66 and clamp 68 arrangement, and can be adjusted in the forward and rearward direction due to the parallelogram arrangement of members 30, 32, 34 and 36 as previously discussed. Further, each forearm resting pad 50 is adjustable via respective clamp 52 to accommodate variable forearm lengths of the operator.

The rounded surface of each keyboards 42 housing provide palmar support to reduce wrist pressure and for uniformly distributing pressures over the arch of the hand. The concave recess formed by the four-shaped portions that the keys reside in comfortably receive the finger tips. As described, the combination rotary encoders 70 and 72 in each arm provide the equivalent of the traditional table top ball movement of a mouse.

Another feature of the present invention is that there is no need for a desk for the keyboard component of a computer. This eliminates requiring a tray in front of the computer to support the keyboard. Further, the arrangement allows one to slide the chair very close to the computer screen such that each keyboard unit 42 can be positioned about each side of the screen rather than in front of the screen. The ball-in-socket arrangement of each keyboard housing 42 about ball member 40 provides enough friction to maintain a selected orientation when accessed by the fingers of the operator, but which friction can be overcome when the operator chooses to rotate keyboard unit 42 about ball member 40 to a selected and comfortable orientation. Again, each keyboard housing 42 has a dual purpose, having a pair of keypads such that either the numerical keypad or the respective portion of a QWERTY keyboard is facing upwardly. Armrest 50 is selectively slidable longitudinally along armrest 36 such that the elbow of the operator extends beyond the distal end of support 50 and no stress is applied to the elbow or wrist while the curved portion 56 of keyboard unit 42 is positioned under the palm of the operator to provide palmar support.

The preferred embodiment of the present invention is based on a medical model and an engineering/ergonomic model which decreases stress, fatigue and injuries associated with data entry work. The design promotes avoidance of posture contributory to upper extremity cumulative trauma.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A combination chair and data entry keyboard assembly, comprising:

a chair having a seat, a backrest attached to said seat, and a pedestal attached to and supporting said seat;

a first and second support arm each coupled to said chair and extending upwardly;

a pair of armrests, one coupled to each of said first and second support arms; and a data entry keyboard bifurcated into first and second keyboard units, each of said first and second keyboard units being spatially separated from the other and being adjustably connected to and supported by one of said arm rests for adjustably positioning each of said first and second keyboard units include means for supporting a palm of an operator.

2. The combination as specified in claim 1 wherein said first and second support arms each include adjustment means and are selectively positionable with respect to said chair.

3. The combination as specified in claim 1 wherein said first and second keyboard units further comprise means for selectively locking said respective keyboard unit with respect to said respective support arm to inhibit adjustment thereof.

4. The combination as specified in claim 2 wherein each said first and second support arms has a height adjustment means for adjusting a height of said respective supported keyboard unit with respect to said chair.

5. The combination as specified in claim 1 wherein each said keyboard units is pivotally attached to a distal end of said respective support arms in a ball-in-socket arrangement.

6. The combination as specified in claim 1 wherein each said support arms bows outwardly from said seat of said chair.

7. The combination as specified in claim 1 wherein each said first and second support arms has an upper surface contoured to receive an arm of an operator.

8. The combination as specified in claim 1 wherein each said support arm comprises a base member coupled to said chair, a first member pivotally attached to said base member, a pair of second members each pivotally attached to said first member at one end, and a third member pivotally attached to the other end of each said second members.

9. The combination as specified in claim 1 wherein at least one of said keyboard units comprise a first and second keypad and is selectably positionable with respect to said respective support arm to facilitate access to only one of either of said first and second keypads at a time.

10. The combination as specified in claim 9 wherein said first keypad comprises a portion of a QWERTY keyboard and said second keypad comprises a numerical keypad.

11. The combination as specified in claim 1 wherein said means for supporting the palm of the operator comprises a convex surface forming a portion of each said first and second keyboard units to provide palmar support.

12. The combination as specified in claim 9 wherein each said first and second keypads is disposed on opposite sides of said respective keyboard unit.

13. The combination as specified in claim 1 further comprising control means coupled to said chair and operatively coupled to each said first and second keyboard units for periodically disabling operation of each said keyboard units.

14. The combination as specified in claim 13 wherein said control means comprises a means for programming a delay period between disabling operations, and a means for resetting each said keyboard units.

15. The combination as specified in claim 1 wherein each said first and second keyboard units further comprise a rotatable track ball.

16. The combination as specified in claim 15 wherein each said rotatable track ball is positioned on an inside surface of each respective keyboard unit corresponding to a thumb location of an operator.

17. The combination as specified in claim 1 further comprising height adjustment means for adjusting a height of said support structure with respect to said chair seat.

18. The combination as specified in claim 1 wherein each of said first and second keyboard units include a plurality of keys, wherein substantially all the keys of each said first and second keyboard units are arranged in a single common surface and in a fan-shape pattern radially extending from said respective palm support means, wherein each said common surface having said keys is curved.

19. The combination as specified in claim 18 wherein each said common surface is concave.

20. A combination chair and data entry keyboard assembly, comprising:

a chair having a seat, a backrest attached to said seat, and a pedestal attached to and supporting said seat;

support means coupled to said chair and extending upwardly wherein said support means comprises a first member rotatably attached to said chair and an armrest member rotatably attached to said first member; and a data entry keyboard bifurcated into first and second keyboard units, each of said first and second keyboard units being spatially separated from the other and supported by said support means, and encoder means operatively coupled to said support means for providing an output signal indicative of a relative position of said support means with respect to said chair, wherein said encoder means comprises a first encoder coupled to said first member providing a first output indicative of a relative position of said first member with respect to said chair, and a second encoder coupled to said armrest member providing a second output indicative of a relative position of said armrest member with respect to said first member.

* * * * *

UNITED STATES PATENT AND TRADEMARK OFFICE
CERTIFICATE OF CORRECTION

PATENT NO. : 5,311,210
DATED : May 10, 1994
INVENTOR(S) : Cathy Mishek O'Brien and J. Craig Paulson, M.D.

It is certified that error appears in the above-indentified patent and that said Letters Patent is hereby corrected as shown below:

In column 11, line 10, after the word "units" and before the word "include", please insert:

-- in three dimensions wherein each of said first and second keyboard units --

Signed and Sealed this

Twentieth Day of September, 1994

Attest:

BRUCE LEHMAN

*Attesting Officer*      *Commissioner of Patents and Trademarks*